(12) United States Patent  
Pfister et al.

(10) Patent No.: US 7,223,001 B2
(45) Date of Patent: May 29, 2007

(54) HEADLIGHT POSITIONING DEVICE

(75) Inventors: Jean-François Pfister, Sonceboz (CH); Jean-Pierre Joigneau, Maule (FR)

(73) Assignee: Société Industrielle de Sonceboz, S.A., Sonceboz (CH)

( * ) Notice: Subject to any disclaimer, the term of this patent is extended or adjusted under 35 U.S.C. 154(b) by 99 days.

(21) Appl. No.: 11/053,133

(22) Filed: Feb. 8, 2005

(65) Prior Publication Data

US 2005/0174796 A1   Aug. 11, 2005

(30) Foreign Application Priority Data

Feb. 9, 2004   (FR) ................... 04 01230

(51) Int. Cl.
    *F21V 19/02*   (2006.01)
(52) U.S. Cl. .................. 362/523; 362/469; 362/531
(58) Field of Classification Search ............... 362/465, 362/467, 468, 472, 491, 507, 538, 529, 531, 362/469
    See application file for complete search history.

(56) References Cited

U.S. PATENT DOCUMENTS

| 3,660,704 | A | * | 5/1972 | Paine et al. ............... 310/80 |
| 3,777,587 | A | * | 12/1973 | Hoshina et al. ............ 74/89.23 |
| 4,951,178 | A | | 8/1990 | Shirai et al. |
| 4,987,822 | A | | 1/1991 | Stoll |
| 5,099,400 | A | * | 3/1992 | Lee .......................... 362/37 |
| 5,105,342 | A | * | 4/1992 | Zillgitt et al. ................ 362/514 |
| 5,416,465 | A | * | 5/1995 | Lin ........................... 340/465 |
| 5,580,148 | A | * | 12/1996 | Liao .......................... 362/493 |
| 5,634,373 | A | | 6/1997 | Cuffe et al. |
| 5,779,343 | A | * | 7/1998 | Denley ........................ 362/507 |
| 5,833,346 | A | * | 11/1998 | Denley ........................ 362/507 |
| 5,909,949 | A | * | 6/1999 | Gotoh ......................... 362/37 |
| 5,957,563 | A | * | 9/1999 | Moore ........................ 362/40 |
| 6,478,457 | B1 | * | 11/2002 | Manley ....................... 362/465 |
| 6,565,245 | B2 | * | 5/2003 | Yokoi ......................... 362/512 |
| 6,641,292 | B2 | | 11/2003 | Miki et al. |
| 2003/0005785 | A1 | | 1/2003 | Ung et al. |
| 2003/0090906 | A1 | * | 5/2003 | Hayakawa ................... 362/517 |
| 2004/0090780 | A1 | * | 5/2004 | Burton ........................ 362/273 |
| 2005/0088852 | A1 | * | 4/2005 | Aguinaga .................... 362/524 |

FOREIGN PATENT DOCUMENTS

EP   0605283   7/1994

* cited by examiner

*Primary Examiner*—Thomas M. Sember
*Assistant Examiner*—Adam C. Rehm
(74) *Attorney, Agent, or Firm*—Clifford W. Browning; Krieg DeVault LLP

(57) ABSTRACT

A vehicle headlight positioning device comprising a pivoting headlight support and a linear actuator comprising a housing (16), an electric stepping motor with a rotor having a part in the form of a nut, and a linear-movement screw engaging the nut part of the rotor. The screw has a coupling portion arranged at one of its ends and is intended to transversely engage a coupling portion part integral with a pivotable headlight support.

4 Claims, 3 Drawing Sheets

HEADLIGHT POSITIONING DEVICE

We claim foreign priority benefits under 35 U.S.C. §119 (a)–(d) or (f), or §365(b) of French Patent Application No. 04 01230, filed on Feb. 9, 2004.

The present invention relates to a vehicle headlight positioning device. The invention relates in particular to a vehicle headlight positioning device with a linear actuator coupled to a pivotable support of a vehicle headlight.

It is known to use linear actuators for adjusting the horizontal and vertical positions of motor vehicle headlights, as described in U.S. Pat. No. 6,641,292 or FR 2 787 863. The adjustment of the tilt angle of headlights has been in use for a long time and is intended to adjust the projection direction of the headlights depending on the load in the vehicle, in order not to dazzle road users coming from the opposite direction. The adjustment of the projection direction in a horizontal plane of the headlight is intended to improve illumination of the road ahead when the vehicle goes round a bend or takes a curve, whereby the direction of the headlights in the horizontal plane change in response to the steering direction of the vehicle. A change in direction of the headlights in the horizontal plane is thus generally very dynamic and requires responsive, efficient and reliable drives.

A drawback of many existing systems is that they are provided with an actuator that is coupled to the headlight through one or more articulations extending generally in line with the axis of the actuator screw or piston. The intermediate elements increase play, decrease reliability and increase of the cost of the system. The in-line coupling with the screw or piston increases the size of the system.

Another drawback of known vehicle headlight position adjustment devices is that they are not well protected from the environment, in particular the linear movement screw or piston is exposed to soiling or interference with objects or debris outside the actuator.

An object of the invention is to provide a motor vehicle headlight positioning system that is reliable, compact, precise and well protected from its environment.

In the present invention, a motor vehicle headlight positioning device comprises a linear actuator for moving a pivoting headlight support, the actuator comprising a housing, an electric stepping motor and a screw and nut system adapted to engage a coupling part integral with the pivoting headlight support. The housing of the actuator surrounds the screw and comprises a longitudinal slot extending along the screw to allow direct transverse connection of the coupling part of the pivoting headlight support to the coupling part of the screw and nut system.

The direct transverse coupling of the pivoting headlight support to the actuator coupling part reduces play as well as the number of components, which provides for a compact configuration and precise positioning. Slots in the housing on each side of the linear screw can be provided, so as to make the actuator symmetrical and usable for engaging the headlight support on the right or left side. It is also possible to provide a single longitudinal slot, extending on the top of the housing with respect to the support on which the actuator is mounted.

Advantageously, the direct engagement of an arm of the movable headlight support to an end of the linear movement screw through a longitudinal slot in the housing ensures a certain degree of protection of the actuator moving parts from the environment, in a compact configuration, whilst reducing the number of parts and articulations which increase play, as well as the costs and complexity of the system.

Other advantageous aims and aspects of the invention will emerge from the claims, the following detailed description and the accompanying drawings, in which:

Figure 1:
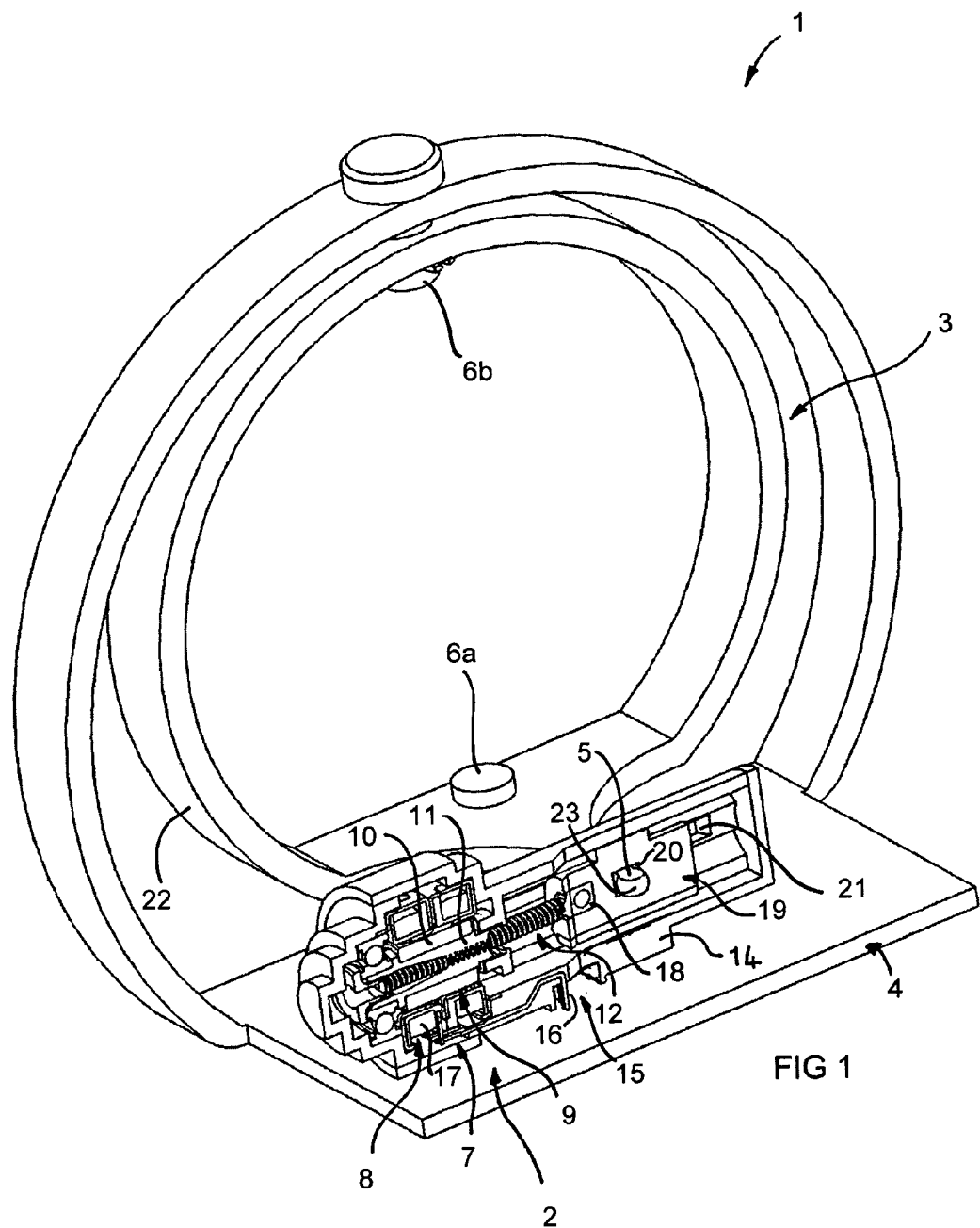
FIG. 1 is a perspective view in section of a headlight positioning device with a linear actuator, according to the invention, engaging a pivoting headlight support.
Figure 2:
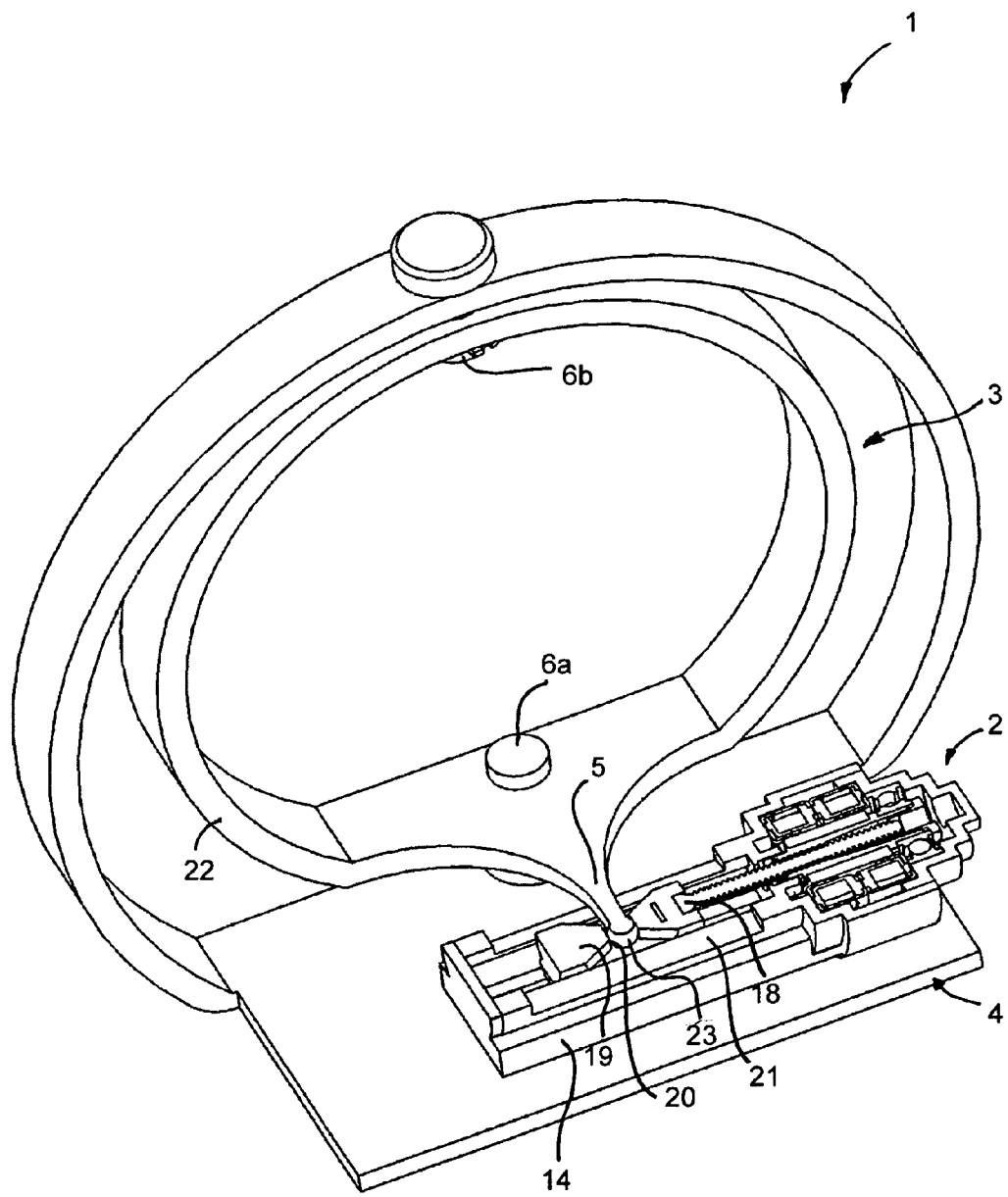
FIG. 2 is a perspective view through another section of the device according to the invention.
Figure 3:
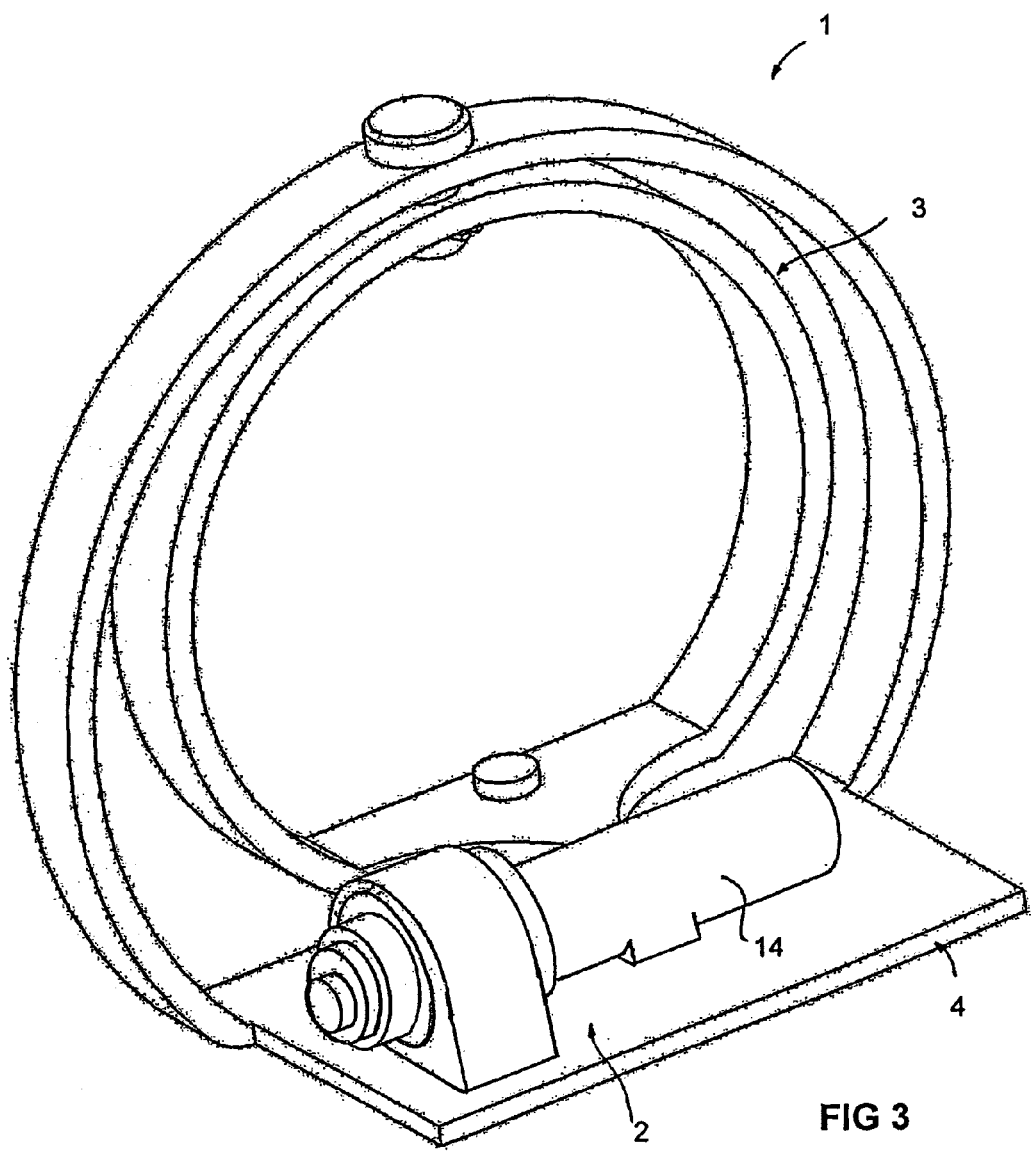
FIG. 3 is a perspective view of the device according to the invention.

Referring to the Figures, a headlight positioning device 1 is illustrated, comprising a linear actuator 2 for pivoting a headlight support 3 about a pivot axis 6 fixed to a support 4.

The actuator 2 comprises a stepping motor 7 with a wound stator part 8 and a rotor 9 with permanent magnets 10 and a nut portion 11, a linear-movement screw 12 engaging the nut portion of the rotor and a housing 12 in which the motor and the linear-movement screw are mounted. The actuator also comprises a connector 15 formed integrally with the housing and comprising electrical terminals 16 connected to the stator windings 17 of the motor.

At an end 18 opposite to the motor, the linear movement screw is fixed to a coupling part 19. In the present embodiment, the coupling part 19 is made from a plastic material fixed to or moulded onto the end of the screw, and mounted so as to be able to slide longitudinally in the housing 14. The coupling part 19 has a non-axisymmetric shape in order to prevent rotation of this part and of the screw.

Within the scope of the invention, it is also possible to have a screw and nut system where the screw comprises a rotor portion driven in rotation by the stepping motor, which threadably engages a linear-movement nut comprising the coupling part. In such an embodiment, the screw is therefore mounted on bearings to allow its rotation yet prevent linear movement, whilst the nut is mounted so as to be able to slide in a linear movement in the housing without rotating.

The coupling part also comprises, in this example, a cavity 20 in which the coupling part 5 integral with the pivoting headlight support 3 is received. In order to allow direct connection between the headlight support and the actuator coupling part 19, the actuator housing is provided with a longitudinal slot 21. The stepping motor, screw and coupling part are thus well protected from the external environment by the housing.

The headlight support can for example be in the general form of a ring 22 mounted on two opposing pivot axes 6a, 6b in a static support 4. The coupling portion or arm 5 of the headlight support is positioned approximately centrally and extends from the pivot axis at its coupling end 23 in a direction transverse to the plane defined by the support ring 22. The longitudinal axis of the linear screw of the actuator is therefore oriented essentially orthogonally to the projection direction of the vehicle headlights, thus allowing a very compact assembly configuration with the headlight.

The plastic material, such as Teflon or Nylon, of the actuator coupling part 19 of the linear screw, makes it easy to adapt the shape of the cavity 20 to the shape of the coupling end 23 of the headlight support, in particular in order to reduce friction and wear and dampen vibration and shocks. The actuator coupling part 19 could also be provided with a finger extending through the housing slot 21 in order to engage in a complementary cavity in extension of the pivoting headlight support.

The invention claimed is:

1. A device motor vehicle headlight positioning device, comprising a pivoting headlight support and a linear actuator comprising a housing (16), a stepping motor (7) and a screw and nut system (9, 12) driven by the motor, the screw and nut system comprising a coupling part (19) for engaging a complementary coupling portion (5) of the pivoting headlight support (3), wherein the housing extends along and surrounds a screw of said screw and nut systems, and wherein the coupling part (19) is mounted slidably in the housing, the housing comprising a longitudinal slot extending along the screw, allowing direct transverse engagement of the coupling portion of the headlight support to the coupling part of the screw and nut system.

2. The device according to claim 1, wherein the coupling portion of the headlight support extends integrally and essentially centrally from a pivot axis (6) of said support to a free end (23) engaging the coupling part (19) of the screw and nut system.

3. The device according to claim 1, wherein the screw and nut system comprises a nut (9) and a linear-movement screw (12), the nut forming part of a rotor of the stepping motor.

4. The device according to claim 3, wherein the coupling part of the screw and nut system is made from a plastic material moulded onto or fixed to an end of the linear-movement screw.

* * * * *